(12) United States Patent
Shyu et al.

(10) Patent No.: US 7,540,982 B2
(45) Date of Patent: Jun. 2, 2009

(54) MOLDING LENS WITH INDENTATION FOR MEASURING ECCENTRICITY AND METHOD FOR MEASURING ECCENTRICITY THEREOF

(75) Inventors: San-Woei Shyu, Taipei (TW); Chi-Hsiung Wang, Taipei (TW); Chih-Hsiung Huang, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 61 days.

(21) Appl. No.: 11/902,974

(22) Filed: Sep. 27, 2007

(65) Prior Publication Data

US 2008/0093759 A1   Apr. 24, 2008

Related U.S. Application Data

(62) Division of application No. 11/583,982, filed on Oct. 20, 2006, now Pat. No. 7,349,161.

(51) Int. Cl.
*B29D 11/00* (2006.01)
*B29C 45/76* (2006.01)
*G02B 3/00* (2006.01)
*G01B 9/00* (2006.01)

(52) U.S. Cl. .................. 264/1.32; 356/127; 264/40.1; 264/2.5

(58) Field of Classification Search ........... 264/1.1–2.7, 264/40.1–40.7; 356/127
See application file for complete search history.

(56) References Cited

U.S. PATENT DOCUMENTS 4,537,732 A * 8/1985 Ueda et al. .................. 264/1.1
5,298,096 A * 3/1994 Yoshino et al. ............... 156/64

* cited by examiner

*Primary Examiner*—Barbara L Gilliam
*Assistant Examiner*—Benjamin Schiffman
(74) *Attorney, Agent, or Firm*—Muncy, Geissler, Olds & Lowe, PLLC

(57) ABSTRACT

A molding lens with indentations for measuring eccentricity and a method for measuring eccentricity thereof are disclosed. At least one indentation concentric with an optical surface is respectively disposed on a front plane and a rear plane of the molding lens on area outside the optical surface while the indentation is observed by means of a measuring microscope. Moreover, the eccentricity of the molding lens is detected by eccentricity test function of the measuring microscope and the eccentric direction is defined so as to modify the lens mould and replace conventional eccentricity test that uses a transmission eccentric scale indicator in combination with a jig. Thus the cost of test equipment is reduced, test procedure is simplified and efficiency of mould modification is improved. Therefore, it's more convenient to manage manufacturing of the lens.

4 Claims, 3 Drawing Sheets

MOLDING LENS WITH INDENTATION FOR MEASURING ECCENTRICITY AND METHOD FOR MEASURING ECCENTRICITY THEREOF

RELATED APPLICATIONS

This application is a Division of currently pending application U.S. Ser. No. 11/583,982, entitled "MOLDING LENS WITH INDENTATION FOR MEASURING ECCENTRICITY AND METHOD FOR MEASURING ECCENTRICITY THEREOF" and filed on Oct. 20, 2006.

BACKGROUND OF THE INVENTION

The present invention relates to a molding lens with indentation for measuring eccentricity and a method for measuring eccentricity thereof, especially to a lens with at least one indentation that is concentric with optical surface and is arranged on, the area outside the optical surface. The indentation is observed by a measuring, microscope. Thus by eccentricity test function of the measuring microscope, the eccentricity of the lens is obtained and the eccentric direction is defined so as to modify the lens mould.

Refer to FIG. 1, a manufacturing process of a molding lens A1 includes following steps: Firstly design front and rear optical surfaces A2 of the lens A1. For example, the optical surfaces A2 are aspheric surfaces having a concave surface and a convex surface. For example, an ultra-precision machine in combination with numerical control (NC) programming is used to define toolpath. That means to set sag value (tool depth) so as to conduct precision machine processing of moulds. As to a curvature lens, the Z-axis is an optical axis of the lens and center of surface is as zero point of X-Y plane. On different positions of the surface of lens, the height difference between a line parallel to the Z-axis and the X-Y plane is the sag value. Moreover, the sag value can also be calculated by equations such as Anamorphic surface, First Type Toric surface or Second Type Toric surface. Then by process of injection molding or die-cast molding, lens are mass produced. After finishing the mould, firstly samples are made to run an eccentricity test for mould modification. Furthermore, each of lens produced needs to go through the test procedure to make sure they are good products.

Refer to FIG. 2, a conventional eccentricity test of the optical surfaces A2 of the lens A1 is disclosed. A transmission eccentric scale indicator A3 in combination with a rotatable jig A4 is used so as to make a parallel light A5 from a light source on the bottom penetrates through the optical surface of the lens A1 being detected to form an image on a screen A6. The transmission eccentric scale indicator A3 is quite expensive so that the manufacturing cost is increased. The jig A4 clips the lens A1 being detected and carries it to rotate while radius of rotation of a focus A7 on the screen A6 is used as criteria for checking eccentricity. Thus the requirement on eccentricity of the jig A4 itself is quite high and the eccentricity of the jig A4 is no more than 2 μm ($10^{-6}$ m) Thus the cost for the jig A4 is also quite high due to operation error of the jig that affects the eccentricity test results. Moreover, except the test results, the error of the jig A4 also have effects on quality control of the lens A1. Furthermore, conventional technology can only check eccentric scale of the lens A1 on the screen A6. The eccentricity of the front and the rear optical surfaces A2 can't be distinguished. Therefore, the eccentricity of the lens A1 on the screen A6 can't be used as modification index directly.

In other words, it is difficult to decide the eccentricity of the lens A1 derived from errors of which optical surface. Thus the optical surface on the mould can't be modified precisely or efficiently and this leads to trouble on mould modification.

SUMMARY OF THE INVENTION

Therefore it is a primary object of the present invention to provide a molding lens with indentation for measuring eccentricity that includes at least one indentation concentric with optical surfaces of the lens on a front plane and a rear plane of the lens respectively, outside the area of the optical surfaces of the lens. The indentation is observed by a measuring microscope so that by means of eccentricity measuring function of the measuring microscope, eccentricity of the lens is measured and eccentric direction is also determined so as to modify a mould for lens. Thus the cost of measuring equipment is reduced, test procedure is simplified, efficiency of mould modification is improved and management of manufacturing lens is improved.

It is another object of the present invention to provide a molding lens with indentation for measuring eccentricity. The optical surfaces and projecting parts corresponding to the indentation on the mould for lens are formed by means of an ultra-precision machine and only one cutting is needed for finishing the processing so as to ensure the indentations and the optical surfaces are concentric.

It is a further object of the present invention to provide a molding lens with indentation for measuring eccentricity that the indentations on the front plane and the rear plane of the lens have different diameter so that the indentations are respectively observed under a measuring microscope. Thus eccentricity of different optical surfaces on the front plane and the rear plane is measured respectively so as to modify each optical surface of the lens mould and further simplify the mould modification procedure.

It is a further object of the present invention to provide a method for measuring eccentricity of the molding lens. At least one indentation concentric with optical surfaces of the lens is disposed on a front plane and a rear plane of the lens respectively, outside the area of the optical surfaces of the lens. The indentation is observed by a measuring microscope so that by means of eccentricity measuring function of the measuring microscope, eccentricity of the lens is measured. Thus the cost of measuring equipment is reduced, test procedure is simplified, efficiency of mould modification is improved and management of manufacturing lens is improved.

It is a further object of the present invention to provide a method for measuring eccentricity of the molding lens that eccentric direction is also determined while measuring eccentricity of the optical surface of the lens so as to modify a mould for lens and improve modification efficiency.

DETAILED DESCRIPTION OF THE PREFERRED EMBODIMENT

Figure 2:
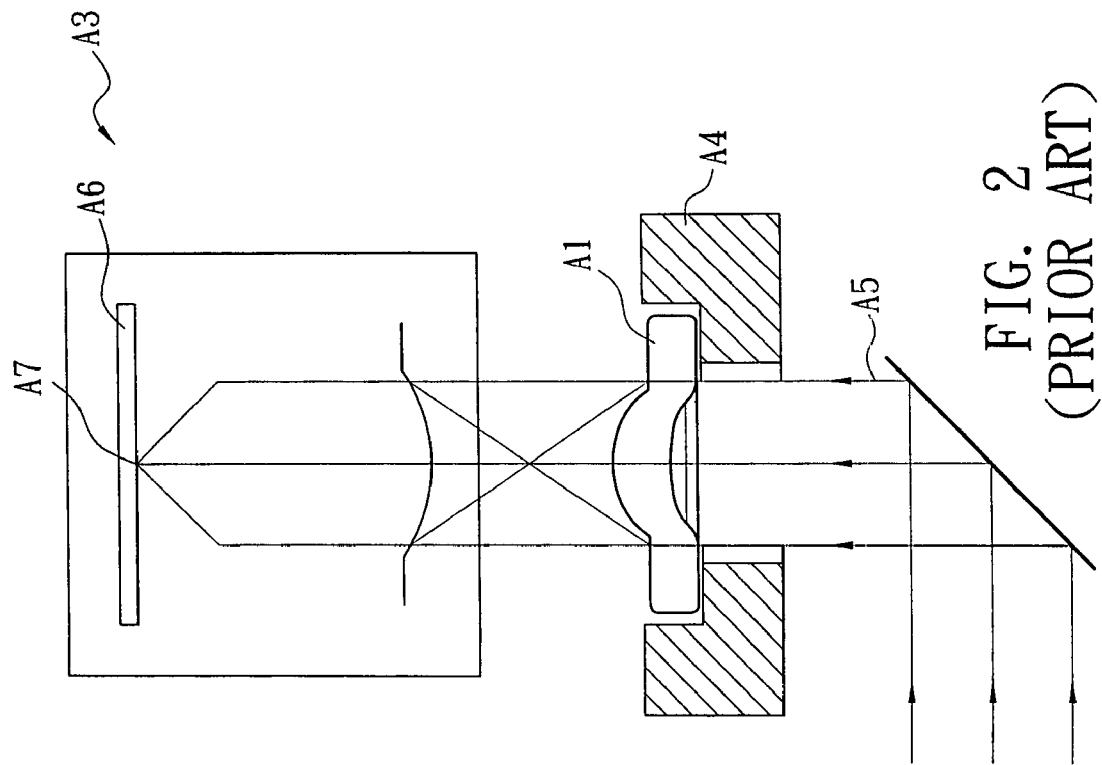
FIG. 2 is a schematic drawing showing conventional eccentricity test of the molding lens.
Figure 1:
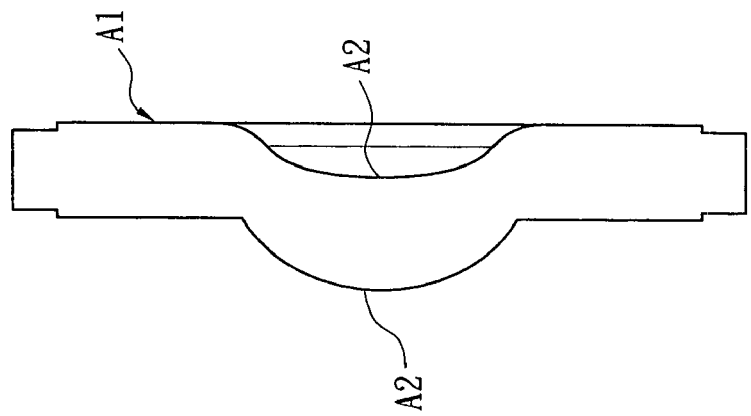
FIG. 1 is a schematic drawing showing cross section of a conventional molding lens.
Figure 3:
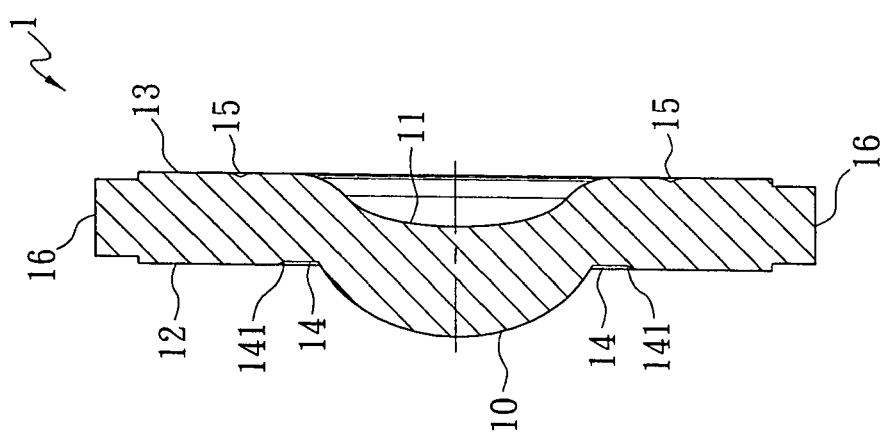
FIG. 3 is a schematic drawing showing cross section of a molding lens according to the present invention.
Figure 7:
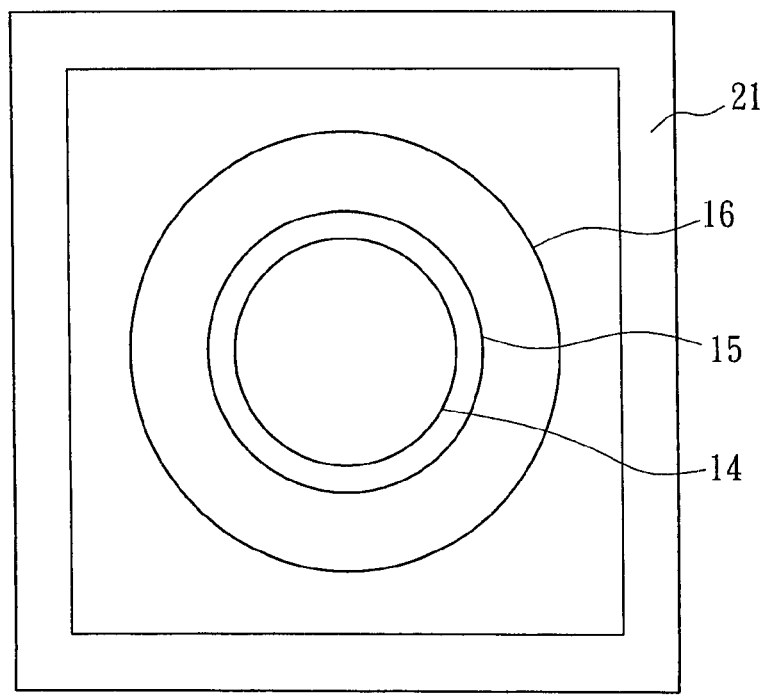
FIG. 7 is a schematic drawing showing the concentric indentation of the present invention observed by a measuring microscope.

Refer to FIG. 3, a molding lens 1 according to the present invention is similar to that of conventional molding lens A1 in FIG. 1, composed of a rear optical surface 10, a front optical surface 11 (two aspheric surfaces-one convex surface and one concave surface), a front plane 12, and a rear plane 13. The device features on that at least one or a plurality of concentric indentations 14, 15 is respectively disposed on area outside the optical surfaces 10, 11 of the front plane 12 and the rear plane 13, as shown in FIG. 3. The indentations 14, 15 are observed by a measuring microscope 2, magnified and displayed on a screen 21 of a camera 20, as shown in FIG. 7. In combination with a X-Y table 22, the eccentricity of the lens 1 is measured and the eccentric direction is determined so as to modify a lens module.

Figure 8:
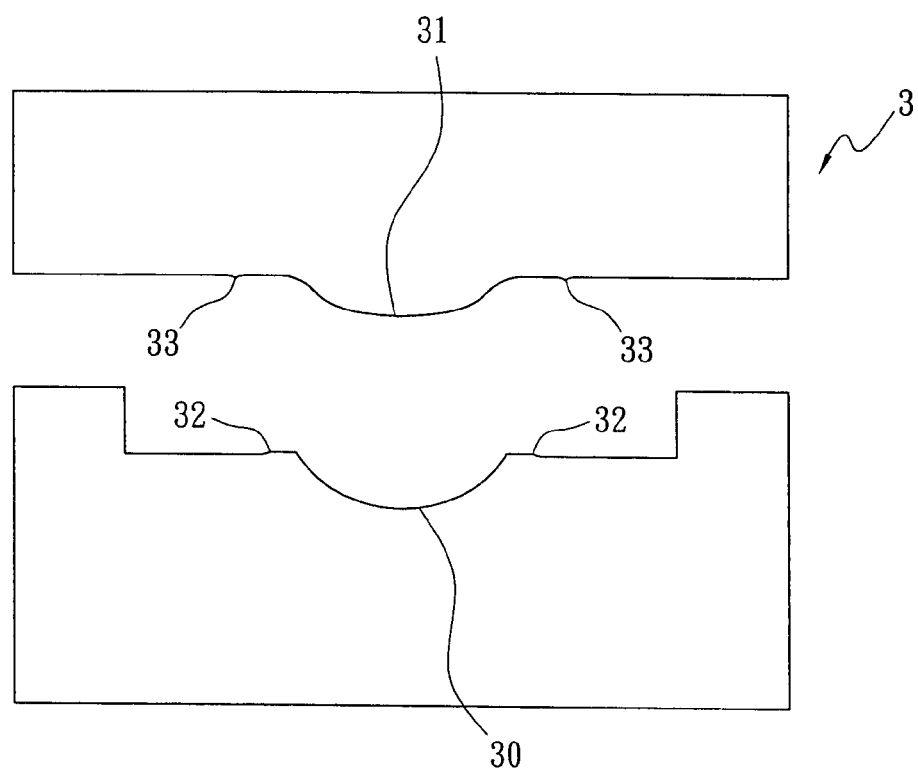
FIG. 8 is a schematic drawing showing a mould of a molding lens according to the present invention.

Refer to FIG. 8, while manufacturing the mould 3 of the lens 1, projecting parts 32, 33 corresponding to the indentations 14, 15 and optical surfaces 30, 31 corresponding to the optical surfaces 10, 11 are formed by cutting tools of the ultra-precision machine. Only one cutting is needed for finishing the processing so as to ensure the indentations 14, 15 and the optical surfaces 10, 11 are concentric.

Figure 6:
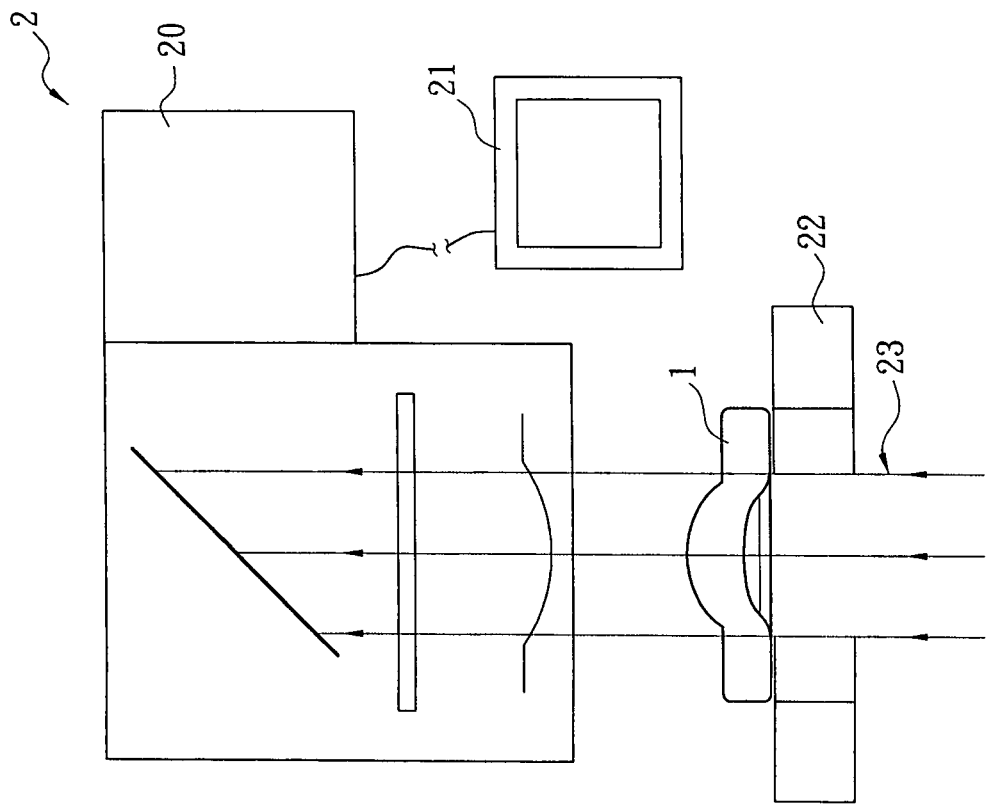
FIG. 6 is a schematic drawing showing eccentricity test of a molding lens according to the present invention.

Refer to FIG. 6 & FIG. 7, while the measuring microscope 2 detecting eccentricity of the lens 1, the lens 1 being detected is set on the X-Y table 22. A backlight light source 23 is disposed under the lens 1 being detected so as to make an amplified image of indentations 14, 15 as well as the image of lens periphery 16 be observed on the screen 21 of the camera 20, as shown in FIG. 7. Then by eccentricity test function of the measuring microscope 2, the eccentricity of the lens 1 is measured. Moreover, while clicking graphic objects by the measuring microscope 2, as shown in FIG. 7, information such as coordinate of the optical surfaces 10, 11 and roundness is obtained. The coordinate is used to calculate the eccentricity and eccentric direction (position) while the roundness is used to check error of manual operation. Once the roundness is too high, it means the position located by manual operation is inaccurate, the object is not arranged horizontally, or the over-shrinkage of the object. Moreover, the eccentric direction of each optical surface can be determined respectively so as to modify the lens mould 3.

Figure 4:
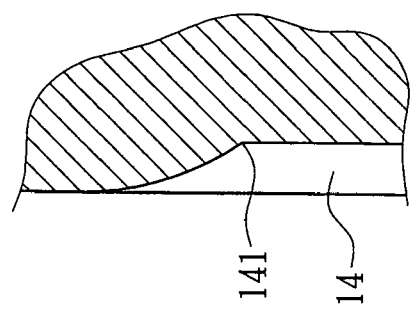
FIG. 4 is an enlarged schematic drawing of a concentric indentation on a front plane of the embodiment in FIG. 3.
Figure 5:
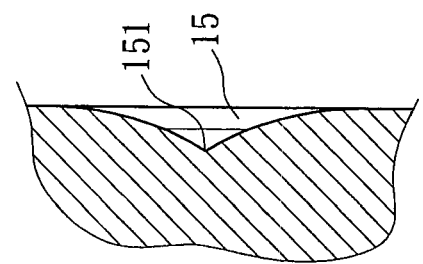
FIG. 5 is an enlarged schematic drawing of a concentric indentation on a rear plane of the embodiment in FIG. 3.

Refer to FIG. 4 & FIG. 5, the indentations 14, 15 are preferably having a sharp angle 141, 151 respectively so that under operation of the backlight light source 22, amplified images of the indentations 14, 15 are displayed on the screen 21 clearly and precisely. Therefore, accuracy of the eccentricity test is improved.

Refer to FIG. 6 & FIG. 7, the indentations 14, 15 with different diameter are disposed on the front plane 12 and the rear plane 13. If the indentation 14 locates more near the center of the optical surface 10, the indentation 15 locates away from the center of the optical surface 11. Thus as shown in FIG. 7, the two indentations 14, 15 observed and displayed by the measuring microscope 2 and the screen 21 of the camera 20 are respectively compared with the periphery 16. Therefore, eccentricity of the front/rear optical surfaces 10/11 of the lens 1 is measured respectively for modifying optical surfaces 30/31 of the mould 3 that corresponds to the optical surfaces 10/11 precisely and efficiently. Moreover, the modification of the mould 3 is simplified.

A method for measuring eccentricity of the molding lens 1 according to the present invention includes the following steps:

manufacture a lens mould 3 and preset projecting parts 32, 33 concentric with the optical surfaces 30, 31 on area outside the optical surfaces 30, 31 of a front plane and a rear plane of the mould 3;

produce lens 1 by the mould 3 so that indentations 14, 15 concentric with the optical surfaces 10, 11 are respectively formed on area outside the optical surfaces 10, 11 of the front and rear planes 12, 13 and the indentations 14, 15 are able to be observed by a general measuring microscope 2;

provide a measuring microscope 2, a camera 20, a screen 21 and a X-Y table 22 having a backlight source 23 thereunder;

put the lens 1 being detected on the X-Y table 22 and observer enlarged images of the indentations 14, 15 as well as lens periphery 16 on the screen 21 of the camera 20 by the backlight source 23 under the X-Y table 22;

measure eccentricity of the optical surfaces 10, 11 of the lens 1 by the indentations 14, 15 concentric with the optical surfaces 10, 11 and the eccentricity test function of the measuring microscope 20;

determine eccentric direction for modification of the mould 3 while measuring eccentricity of the optical surfaces 10, 11 of the lens 1.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for measuring eccentricity of a molding lens comprising steps of:

manufacture a lens mould and present projecting parts concentric with optical surfaces on an area outside the optical surfaces of a front plane and a rear plane of the lens mould;

produce lens by the lens mould so that indentations concentric with the optical surfaces are respectively formed on the front plane and the rear plane;

use a microscopic measuring device to observe and measure the indentations as well as lens periphery;

use the indentations and lens periphery to measure eccentricity of the optical surface of the lens.

2. The method as claimed in claim 1, wherein the step of manufacturing a lens mould, the optical surfaces and the projecting parts on the lens mould are formed by one cutting process so that the optical surfaces and the indentations are concentric.

3. The method as claimed in claim 1, wherein the microscopic measuring device comprising a measuring microscope, a camera, a screen and a X-Y table having a backlight source thereunder.

4. The method as claimed in claim 1, wherein while measuring eccentricity of the optical surface of the lens, eccentric direction is determined at the same time so as to modify the lens mould.

* * * * *